US008739233B2

(12) United States Patent
Schlack

(10) Patent No.: US 8,739,233 B2
(45) Date of Patent: May 27, 2014

(54) METHOD AND SYSTEM FOR PROVIDING DIFFERENT FORMATS OF ENCODED CONTENT IN A SWITCHED DIGITAL VIDEO (SDV) SYSTEM

(75) Inventor: John Schlack, Quakertown, PA (US)

(73) Assignee: General Instrument Corporation, Horsham, PA (US)

( * ) Notice: Subject to any disclaimer, the term of this patent is extended or adjusted under 35 U.S.C. 154(b) by 333 days.

(21) Appl. No.: 12/039,809

(22) Filed: Feb. 29, 2008

(65) Prior Publication Data
US 2009/0222872 A1   Sep. 3, 2009

(51) Int. Cl.
*H04N 7/173* (2011.01)
(52) U.S. Cl.
USPC ............... 725/95; 725/90; 725/94; 725/96; 725/116
(58) Field of Classification Search
None
See application file for complete search history.

(56) References Cited

U.S. PATENT DOCUMENTS

| 7,376,829 B2* | 5/2008 | Ranjan ..................... 713/153 |
| 2005/0198686 A1* | 9/2005 | Krause et al. ............. 725/118 |
| 2008/0077965 A1* | 3/2008 | Kamimaki et al. ........ 725/105 |

* cited by examiner

*Primary Examiner* — Nasser Goodarzi
*Assistant Examiner* — Fred Peng
(74) *Attorney, Agent, or Firm* — Lori Anne D. Swanson

(57) ABSTRACT

A method, system and devices for delivering a switched digital video (SDV) channel to a network element, such as an end user set-top box, based on the decoding capabilities of the network element. The system determines whether to deliver the SDV channel in a first format, such as MPEG-4, or a second format, such as MPEG-2. When only network elements capable of decoding MPEG-4 content are tuned to the SDV channel, the system can realize bandwidth savings by delivering only the MPEG-4 version of the SDV channel. When legacy network elements capable of decoding only MPEG-2 content tune to a particular SDV channel, the system delivers only the MPEG-2 version of the SDV channel. The methods and devices can be used in headends, including those that deploy switched digital video, and other appropriate locations within the content distribution system, such as within the edge devices in the distribution hub.

20 Claims, 4 Drawing Sheets

METHOD AND SYSTEM FOR PROVIDING DIFFERENT FORMATS OF ENCODED CONTENT IN A SWITCHED DIGITAL VIDEO (SDV) SYSTEM

BACKGROUND OF THE INVENTION

1. Field of the Invention

The invention relates to providing digital content to network elements, such as end user set-top boxes and other processing devices, in a switched digital video (SDV) system. More particularly, the invention relates to providing encoded digital content to network elements based on the decoding capabilities of the network elements.

2. Description of the Related Art

Many conventional network elements, such as end user set-top boxes and other digital content processing devices, are configured to decode video (and data) content that has been encoded using an MPEG-2 (Moving Pictures Expert Group) compression algorithm codec (coder-decoder). The cable industry has standardized the delivery of MPEG-2 video content at 3.75 Mbps (Megabits per second) for standard definition televisions. The bandwidth of MPEG-2 video content balloons to between 12 Mbps and 19.2 Mbps for high definition (HD) video content.

Video content encoded according to the MPEG-4, Part 10 video compression standard uses approximately 50-70% of the bandwidth of MPEG-2 video content, yet with the same or better quality as MPEG2 video content. MPEG-4, Part 10 video compression, which also is referred to using the terms H.264 and AVC (advanced video coding), is referred to herein simply as MPEG-4.

The cable industry has begun a shift towards encoding video content using an MPEG-4 (or similar) codec. For example, at least one television network has announced that they will deliver the high definition television (HDTV) versions of all their channels to cable headends using MPEG-4 encoding. However, an MPEG-2 decoder typically can not decode video content that has been encoded using an MPEG-4 encoder.

Digital set-top boxes and other network elements soon will be introduced that will be able to decode both MPEG-2 and MPEG-4 video. Once this introduction occurs, the content distribution systems will contain existing (legacy) set-top boxes and network elements that can decode only MPEG-2 signals, as well as newer, more advanced set-top boxes and network elements that can decode both MPEG-2 and MPEG-4 signals. Also, it likely will take many years, and perhaps a decade or more, to transition all set-top boxes and network elements to support MPEG-4 video. During this transition, it likely will not be possible to broadcast all video content channels in both MPEG-2 and MPEG-4 format, due to bandwidth constraints.

Accordingly, there is a need for a system and corresponding devices that can be used to manage the transition from MPEG-2 to MPEG-4, and to reduce the bandwidth needed by the system until such transition is complete.

DETAILED DESCRIPTION

Figure 1:
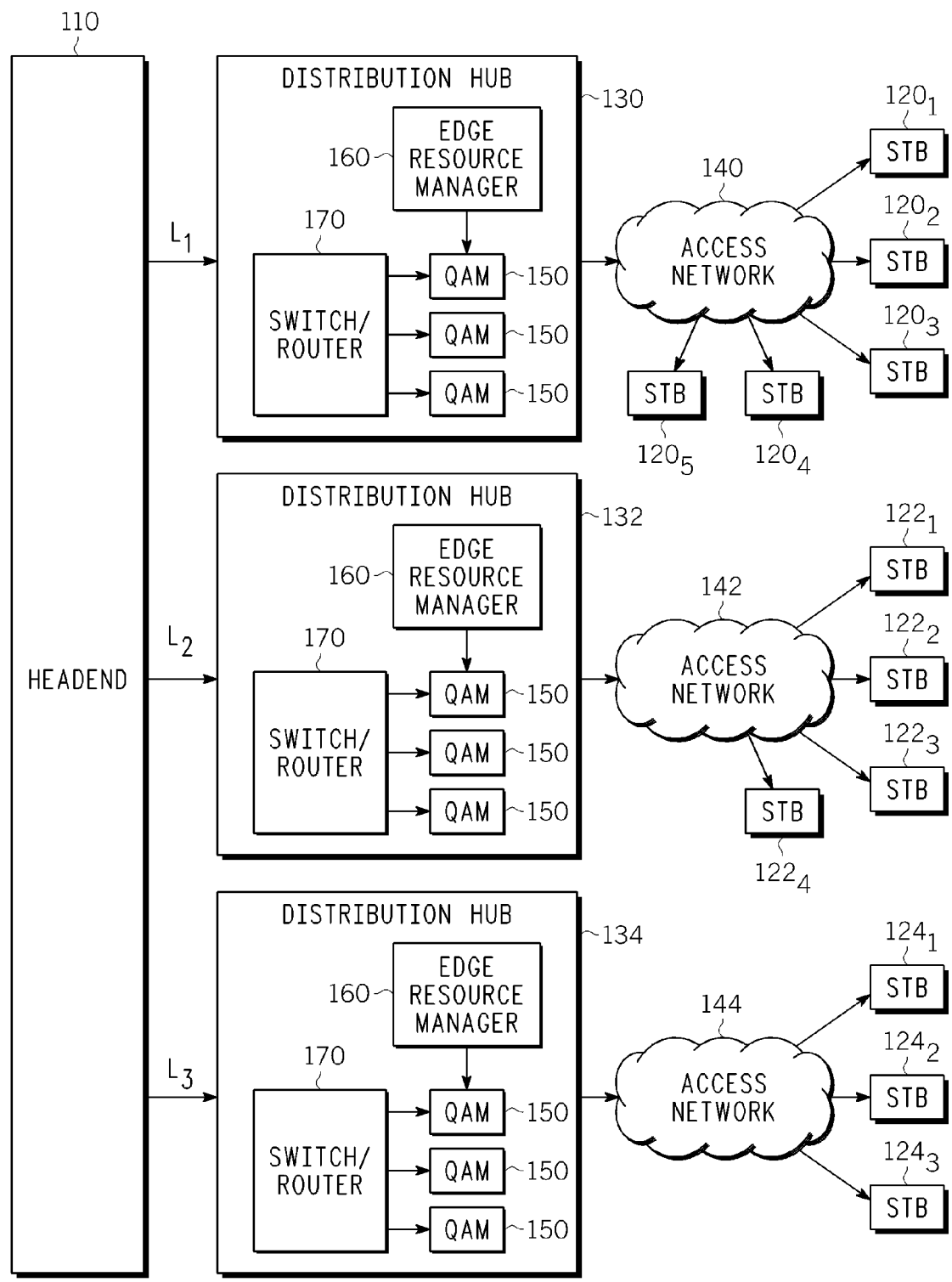
FIG. 1 is a block diagram of a switched digital video (SDV) system.

In the following description, like reference numerals indicate like components to enhance the understanding of the methods, devices and systems described herein through the description of the drawings. Also, although specific features, configurations and arrangements are discussed herein below, it should be understood that such specificity is for illustrative purposes only. A person skilled in the relevant art will recognize that other steps, configurations and arrangements are useful without departing from the spirit and scope of the invention.

The methods, systems and devices described herein involve delivering digital (video and data) content streams to a network element, such as an end user set-top box, based on the decoding capabilities of the network element. Such methods and devices are useful in a switched digital video (SDV) system. The methods, devices and systems use the capabilities of all the network elements tuned to a particular channel to determine whether to deliver the content stream on the SDV channel in a first format, such as an MPEG-4 version of the content stream, or a second format, such as an MPEG-2 version of the content stream. When only network elements that are capable of decoding MPEG-4 content are tuned to an SDV channel, the system can realize bandwidth savings by delivering only the MPEG-4 version of the content stream. However, when (legacy) set-top boxes and network elements that are capable of decoding only MPEG-2 content tune to a particular SDV channel, the system transitions back to delivering only the MPEG-2 version of the content stream. Using different technologies, one system configuration manages MPEG-2/MPEG-4 content delivery by force tuning set-top boxes and network elements between different versions of the content stream. Another system configuration transcodes the content stream during delivery, i.e., in real-time. The methods and devices described herein can be used in cable headends, including those that deploy switched digital video, and other appropriate locations within the content distribution system, such as within the edge devices in the hub.

Switched digital video (SDV) refers to an arrangement in which broadcast channels are only switched onto the network when they are requested by one or more subscribers, thereby allowing system operators to save bandwidth over their distribution network. In conventional cable or satellite broadcast systems, every broadcast channel is always available to all authorized subscribers. In contrast, in a switched digital video system, a switched digital video channel is only available when requested by one or more authorized subscribers. Typically, only a certain number of the digital broadcast channels are being watched by subscribers in the same service group at any given time. Those channels not requested by a subscriber need not be broadcast, thereby saving bandwidth.

Also, unlike video on-demand, which switches a singlecast interactive program to an authorized user, switched digital video systems switch broadcast streams, making each stream available to one or more subscribers who simply join the broadcast stream just as they would with normal broadcast services. That is, once a switched service is streamed to a subscriber, subsequent subscribers associated with the same service group as the first subscriber can tune to the same broadcast stream. The switched digital video will often share the same resource managers and underlying resources with other on-demand services.

One way to support switched digital video is to use a session manager to manage SDV sessions. The subscriber can set up an SDV session with the session manager when an SDV program is requested. The session manager determines if the requested channel already is being sent to the corresponding service group to which the subscriber belongs. The subscriber will be assigned to join the existing SDV session if the requested channel is available at the service group, or assigned to a new SDV session if the requested channel is not available at the service group. The session manager will direct the edge devices to allocate resources required for the session. The edge device, such as a QAM modulator or other suitable modulator, dynamically retrieves the MPEG single program transport stream that carries the requested broadcast program (likely via IP unicast or multicast) and generates the MPEG multiple program transport stream. As part of the session setup response message, the video tuning parameters, such as frequency and MPEG program number, are sent back to the subscriber to access the requested broadcast channel.

Referring now to FIG. 1, shown is a block diagram of a conventional switched digital video (SDV) system or system architecture 100. The SDV system 100 includes a content source such as a headend 110 that is connected to multiple intermediate entities or distribution hubs, e.g., such as a hub 130, a hub 132 and a hub 134. The headend 110 communicates with a switch or router 170 in hubs 130, 132, 134 over links L1, L2 and L3, respectively. The headend 110 and hubs 130, 132, 134 can communicate over a packet-switched network, such as a cable data network, a passive optical network (PON) or other suitable network using IP multicast addressing or other suitable addressing scheme.

Each of the hubs typically services one or more network elements 120, such as end user locations including set-top boxes and other video processing devices, which are coupled to their respective hub via one or more distribution networks, such as local cable access networks (e.g., HFC networks). For example, the network element can include one or more of a signal converter box, a signal decoder box, a set-top box, a digital video recorder, a digital video disk recorder, a personal video recorder device, a home media server, a digital video server, a residential gateway, a video receiver and a computer.

For simplicity of explanation only, each hub is shown connected to a distinct HFC network, which, in turn, communicates with end user equipment as shown. For example, the hubs 130, 132 and 134 communicate with access networks 140, 142 and 144, respectively, and each access network 140, 142 and 144, in turn, communicates with multiple network elements 120, such as end user set-top boxes, subscriber terminals or other end user devices. For example, as shown, the access network 140 communicates with set top terminals $120_1$, $120_2$, $120_3$, $120_4$ and $120_5$; the access network 142 communicates with set top terminals $122_1$, $122_2$, $122_3$ and $124_4$; and the access network 144 communicates with set top terminals $124_1$, $124_2$ and $124_3$.

In addition to the switch or router 170, each hub can include an array of radio frequency transmitter edge devices, such as edge QAM (EQAM) modulators 150. The number of edge devices 150 in each hub may vary as needs dictate. As used herein, the term "QAM" refers to Quadrature Amplitude Modulation schemes used for sending signals over cable access networks. Such modulation schemes might use any constellation level (e.g., QAM-16, QAM-64, QAM-256) depending on the details of the cable access network. A QAM may also refer to a physical channel modulated according to such schemes. Typically, a single QAM modulator can output a multiplex of ten or twelve programs, although the actual number will be dictated by a number of factors, including the communication standard that is used. The edge QAM modulators usually are adapted to: (i) receive Ethernet frames that encapsulate the transport packets, (ii) de-capsulate these frames and remove network jitter, and (iii) transmit radio frequency signals representative of the transport stream packets to end users locations, e.g., over the HFC network. Each transport stream is mapped to a downstream QAM channel. Each QAM channel has a carrier frequency that differs from the carrier frequency of the other channels. The transport streams are mapped according to a channel plan designed by the multiple system operator (MSO) that operates the network.

Each hub 130, 132 and 134 also includes an edge resource manager 160. The edge resource manager 160 allocates and manages the resources of the edge devices 150. The edge resource manager 160 also communicates with and receives instructions from the session manager, which typically is located in the headend 110, as will be discussed in greater detail hereinbelow.

Figure 2:
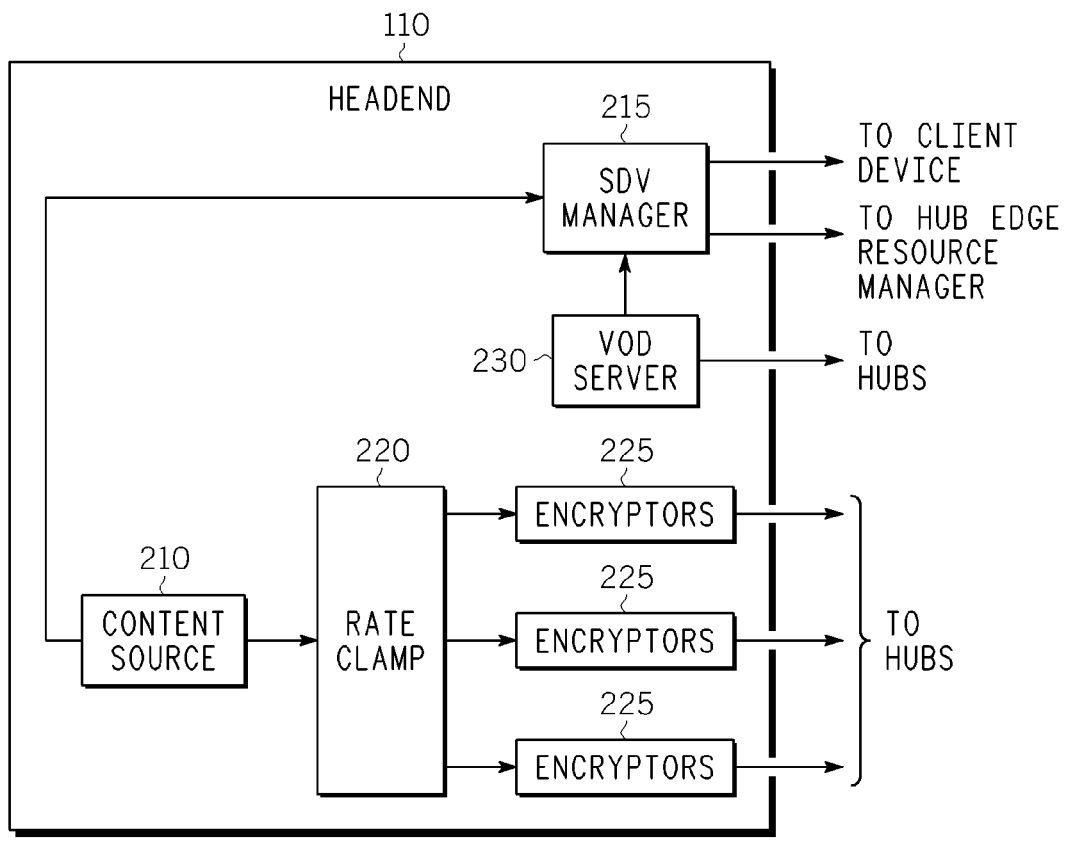
FIG. 2 is a block diagram of a headend suitable for use in the SDV system of FIG. 1.

Referring now to FIG. 2, shown is a block diagram of the headend 110 within the system 100. The headend 110 includes and/or receives content from a broadcast content source 210, which may include, e.g., satellite receivers, off-air receivers and/or content storage devices, such as servers. An SDV manager or session manager 215 is used to determine which SDV transport streams are active at any time and for directing the network elements (e.g., end user set-top boxes) 120 to the appropriate stream. The SDV manager 215 also keeps track of which network element subscribers are watching which channels, and communicates with the edge resource managers 160 in the distribution hubs so that the content can be switched on and off under the control of the SDV manager 215. Also, all network element subscriber requests for a switched digital channel go through the SDV manager 215. The switched digital channels are forwarded to a rate clamp 220 and one or more encryptors 225 using an appropriate addressing scheme, such as Internet Protocol (IP) multicast addressing. The content then is encrypted by the encryptors 225 and transmitted to the appropriate distribution hub or hubs.

The headend 110 also can include other components for offering additional services. For example, the headend 110 can include a video on demand (VOD) server 230, which is configured to store programs and other content for distribution to network element subscribers on an on-demand basis via an appropriate distribution hub.

One or more of the components within the headend 110 can be comprised partially or completely of any suitable structure or arrangement, e.g., one or more integrated circuits. Also, it should be understood that the headend 110 includes other components, hardware and software (not shown) that are used for the operation of other features and functions of the headend 110 not specifically described herein. For example, the headend 110 can include a billing module, an advertising insertion module, a subscriber management system (SMS), a conditional access system and a LAN(s) for placing the various components in data communication with one another. Also, it will be appreciated that the headend configuration depicted is a high-level, conceptual architecture and that each network may have multiple head-ends deployed using different architectures.

The headend 12 can be partially or completely configured in the form of hardware circuitry and/or other hardware components within a larger device or group of components. Alternatively, the headend 12 can be partially or completely configured in the form of software, e.g., as processing instructions and/or one or more sets of logic or computer code. In such configuration, the logic or processing instructions typically are stored in a data storage device coupled to the SDV manager 215. The SDV manager 215 accesses the necessary instructions from the data storage element and executes the instructions or transfers the instructions to the appropriate location within the headend 12.

When an end user selects an SDV channel using a network element 120, the SDV system actively switches the selected channel onto one of the QAMs that serves that particular network element. The network elements generally are arranged into service groups and each of the service groups is assigned to, and serviced by, one or more QAM modulators. For example, in the arrangement depicted in FIG. 1, the network elements $120_1$, $120_2$, $120_3$, $120_4$ and $120_5$ are assigned to the QAM modulators 150 located at the distribution hub 130; the network elements $122_1$, $122_2$, $122_3$ and $122_4$ are assigned to the QAM modulators 150 located at the distribution hub 132; and the network elements $124_1$, $124_2$ and $124_3$ are assigned to the QAM modulators 150 located at the distribution hub 134. Typically, four (4) or eight (8) QAM modulators are deployed per service group to carry the SDV channels. The SDV service groups currently can include from about 500 to 1000 network elements. Depending on the system topology, there may or may not be a one-to-one correspondence between the distribution hubs and the service groups. For example, typically, each distribution hub serves multiple service groups.

As discussed hereinabove, with the trend toward MPEG-4 encoders and video content delivery in MPEG-4 format, distribution systems will, for the time being, include both MPEG-2 and MPEG-4 decoding network elements. When content providers begin delivering multimedia content in MPEG-4 format, the MSOs will need to transcode the signals into an MPEG-2 version so that legacy network elements (e.g., MPEG-2 set-top boxes) will be able to decode the stream. Also, because service groups that have MPEG-2 network elements also may include MPEG-4 network elements, MSOs can save system (QAM) bandwidth and improve content delivery efficiency if they deliver MPEG-4 versions of the streams when only MPEG-4 decoders or network elements in the service group are watching the channels of those streams.

To accomplish these and other system improvements, the distribution system includes one or more transcoders within the distribution system and uses the capabilities of the various network elements tuned to a particular channel to determine whether to deliver the content stream on the SDV channel in an MPEG-2 or MPEG-4 format. The transcoders can be used to produce MPEG-2 versions of the streams. That is, when necessary, a transcoder converts the content from MPEG-4 format to MPEG-2 format for decoding by legacy network elements. The transcoders can be standalone components within the system or integrated within one or more existing system components, e.g., the edge device, the VOD server, the network encryptor or other appropriate network component that receives and outputs content. Although not necessary, the transcoders can be placed close to the edge devices to reduce the cost of network transport.

Figure 3:
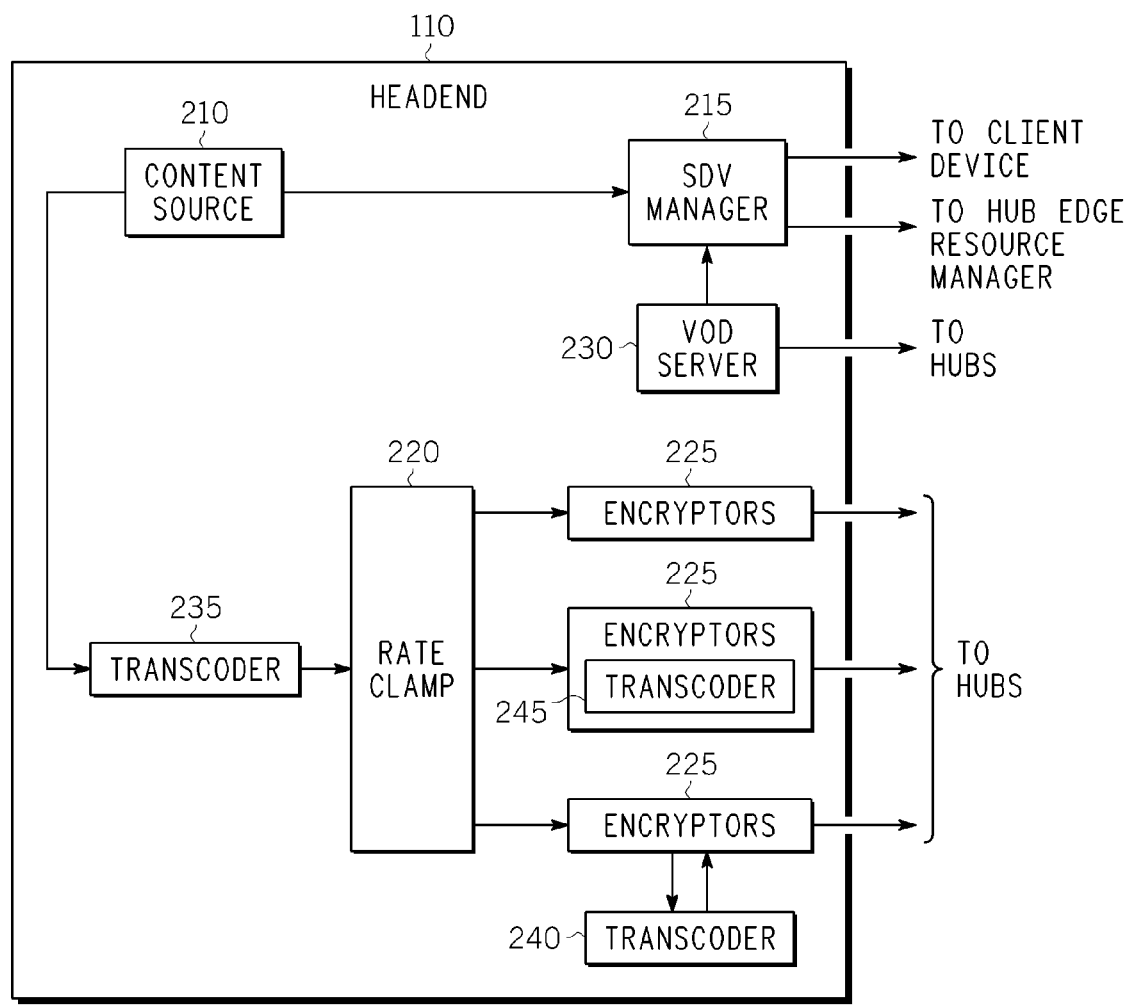
FIG. 3 is a block diagram of a headend suitable for use in an SDV distribution system, including one or more content format transcoders integrated within the headend.

Referring now to FIG. 3, shown is a block diagram of an SDV distribution system headend, including one or more content format transcoders integrated within the headend. For example, a transcoder 235 can be coupled between the content source 210 and the rate clamp 220. Alternatively, a transcoder 240 can be coupled to one or more network encryptors 225. Alternatively, a transcoder 245 can be integrated within one or more of the network encryptors 225.

Using one or more of these transcoders, the SDV distribution system can deliver content streams to the end user network elements based on the capabilities of the network elements. For example, if a set-top box supports decoding only MPEG-2 signals, the SDV system, using one or more transcoders, will make sure that the particular set-top box is directed only to tune to content streams that are encoded using the MPEG-2 format. By including one or more transcoders in the headend 110, the headend 110 can deliver both the MPEG-2 and MPEG-4 versions of the same channel from the headend 110 to one or more distribution hubs 130, 132, 134. The distribution hubs then can decide whether to deliver one or both versions of a particular channel, depending on the decoding capabilities of the set-top boxes within a particular service group supported by the particular distribution hub.

Such SDV distribution system can be pre-configured with the capabilities of the individual set-top boxes and other end user network elements. For example, the capabilities may be statically tracked by the model number of the set-top box, and the set-top box model can be associated with each household. Alternatively, when the set-top box registers with the SDV system, the set-top box can send a message to the SDV system that includes the capabilities of the registering set-top box. The capabilities may include any number of capability parameters, such as the number of tuners, the video and audio codecs supported, and the communication methods supported.

The SDV distribution system directs channels to a service group based on requests from the set-top box or other network element within that service group. In the case where both MPEG-2 and MPEG-4 versions of a content stream are available, it is possible to get into a situation where both versions need to be delivered to a service group if that service group has both MPEG-4 set-top boxes and MPEG-2 (legacy) set-top boxes. Note that this assumes that the MPEG-4 set-top box also can decode MPEG-2 transport streams.

Although it is possible to transcode content encoded in MPEG-2 format into MPEG-4 format to save bandwidth, the SDV system likely will have content that is only encoded in MPEG-2 format. In such case, the SDV system will deliver the MPEG-2 version of the stream when requested by an MPEG-2 set-top box or an MPEG-4 set-top box. Note that this assumes that the MPEG-4 set-top box also can decode MPEG-2 encoded content.

The SDV system may have content that is only encoded in MPEG-4 format. In such case, the SDV system can deliver such content only to MPEG-4 set-top boxes. MPEG-2 set-top boxes would be denied service. However, the channel map for the MPEG-2 set-top boxes should prevent subscribers from accessing the content if the set-top box cannot view it. For example, the cable operator may have created a special HD tier that is available as a premium package. A subscriber would receive an MPEG-4 set-top box when subscribing to that premium package so that the subscriber can view that HD content.

For content that is encoded in MPEG-2 format and MPEG-4 format, the SDV system likely will be configured to attempt to deliver only a single encoding of that channel to conserve bandwidth.

When a set-top box that is capable of decoding only MPEG-2 content requests that same channel, the SDV system directs the MPEG-2 stream for that SDV channel to the service group of the requesting MPEG-2 set-top box and returns the tuning information to the requesting MPEG-2 set-top box. If an MPEG-4 set-top box in the same service group then requests the same SDV channel, the SDV system directs the MPEG-4 set-top box onto the MPEG-2 stream that is already being delivered to the service group.

However, assume that a particular SDV channel currently is not being delivered, and an MPEG-4 set-top box requests that channel. In such case, the SDV system directs the MPEG-4 stream for the requested SDV channel to the service group of the requesting MPEG-4 set-top box and returns the tuning information to the requesting MPEG-4 set-top box. If an MPEG-2 set-top box in the same service group then requests that same SDV channel, the SDV system must direct the MPEG-2 version of the SDV channel to that service group and return the tuning information for the MPEG-2 stream to the requesting MPEG-2 set-top box. Thus, two different versions of the stream are being delivered to the same service group to accommodate both the MPEG-2 set-top boxes and the MPEG-4 set-top boxes. Carrying both MPEG-2 and MPEG-4 versions of the same SDV channel is inefficient, because it requires at least 50% more bandwidth than carrying only the MPEG-2 version of the channel.

When both MPEG-4 and MPEG-2 versions of the same channel are being delivered to a service group, the SDV distribution system may allow both versions of the channel, if there is sufficient bandwidth. The SDV distribution system can direct new tuning requests for that channel onto the MPEG-2 version of the content stream in hopes of recovering resources when the MPEG-4 set-top boxes tuned to the MPEG-4 version of the channel tune off. In this manner, the SDV distribution system can gradually recover resources without force tuning all set-top boxes to the MPEG-2 version of the channel, which can be disruptive to the viewing experience.

However, when both MPEG-4 and MPEG-2 versions of the same channel are being delivered to a service group, the SDV distribution system can choose to force viewers to the MPEG-2 version of the channel if system resource availability gets relatively low. Although the forced tune operation can be disruptive to the viewing experience, because the set-top box must re-tune, the force tune operation can be the most efficient way to reduce resource usage in the system. To reduce disruption during a forced tune operation, the SDV distribution system can place both the MPEG-4 and MPEG-2 versions of the same channel on the same QAM modulator. This reduces disruption because the set-top box decoder already is receiving other portions of the transport stream, such as the program allocation table (PAT) and the program map table (PMT). Therefore, the set-top box simply can start decoding a different set of packet identifications (PIDs) associated with the MPEG-2 stream.

The previous discussion regarding the use of one or more transcoders within the headend 110 includes static transcoding, in which the headend 110 and/or headend network carries (and delivers) both MPEG-2 and MPEG-4 versions of the same SDV channel to support both legacy MPEG-2 set-top boxes and MPEG-4 set-top boxes. Alternatively, the SDV distribution can use dynamic transcoding, in which the SDV distribution system directs a single MPEG stream onto the service group for each SDV channel. The MPEG stream is dynamically transitioned between MPEG-2 and MPEG-4 based on the decoding capabilities of the set-top boxes and other network elements tuned to that SDV particular channel.

Figure 4:
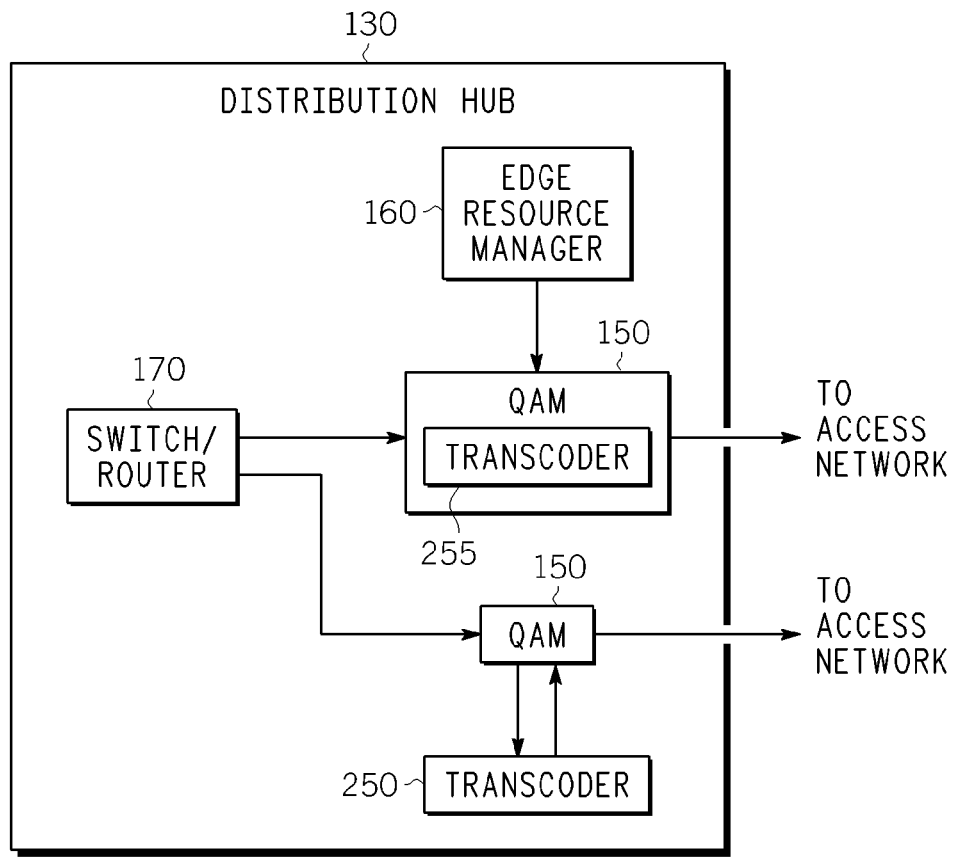
FIG. 4 is a block diagram of a distribution hub suitable for use in an SDV content distribution system, including one or more content format transcoders included within the distribution hub.

Referring now to FIG. 4, shown is a block diagram of a distribution hub within an SDV content distribution system, including one or more dynamic content format transcoders included within the distribution hub. For example, a transcoder 250 can be coupled to one or more EQAM modulator 150. Alternatively, one or more of the EQAM modulators 150 can include a transcoder 255 integrated therein.

The SDV manager 215 in the headend 110 (FIG. 1) typically controls the dynamic transcoding of SDV content, although such is not necessary. One benefit of transcoding the content in the distribution hub or other edge location is that the content distribution network only carries a single copy of the SDV content stream, e.g., from the headend 110 to the distribution hub. Then, on a service group by service group basis, i.e., an EQAM by EQAM basis, components within the distribution hub, e.g., an EQAM, can be directed to output either the MPEG-2 version or the MPEG-4 version of a particular requested SDV channel.

For example, assume that a particular SDV channel is being delivered in MPEG-2 format to a mix of legacy (MPEG-2) set-top boxes and MPEG-4 set-top boxes. The legacy set-top boxes tune to other SDV channels by sending channel change requests to the SDV manager 215 in the headend 110. The SDV manager 215 tracks the status of the requesting set-top boxes and determines that only MPEG-4 set-top boxes are on the requested SDV channel. The SDV manager 215 sends a message to the edge resource manager 160 (or other appropriate edge device) directing the EQAM modulator 150 to transition from the MPEG-2 version of the content stream to the MPEG-4 version of the content stream for the requested SDV channel. The SDV manager 215 then updates its internal database to correctly track the bandwidth of the affected QAM modulator 150, because the MPEG-4 version of the content stream requires less bandwidth than the MPEG-2 version of the content stream.

It should be noted that the SDV manager 215 may not immediately direct the transition of an MPEG-2 stream to an MPEG-4 stream as soon as all MPEG-2 set-top boxes tune off. The SDV manager 215 may use heuristics or other appropriate means to determine the appropriate transition time, because end user viewing behavior may indicate that some MPEG-2 set-top boxes have only changed channels temporarily (i.e., channel surfing) and likely will return to the original SDV channel shortly. Also, for example, the SDV manager 215 may have the advertisement times for a particular SDV channel. If MPEG-2 set-top boxes tune off the SDV channel during commercial breaks, the SDV manager 215 may wait until the original program resumes before determining whether to transition to the MPEG-4 version of the content stream for that particular SDV channel.

Assume that a particular SDV channel is being delivered in MPEG-4 format to a set of MPEG-4 set-top boxes within a given service group. When a legacy (MPEG-2) set-top box in that service group requests that particular SDV channel, the SDV manager 215 directs the edge device (e.g., the appropriate EQAM modulator 150) to transcode the SDV channel to MPEG-2 format. The transcoder coupled to or included in the edge device will begin to transcode the content at the next appropriate location, e.g., at the next group of picture (GOP) or I-frame boundary. The edge device then sends a message or response to the SDV manager 215 that the MPEG-2 transition has been completed. The SDV manager 215 returns the tuning information to the MPEG-2 set-top box.

It should be noted that the SDV manager 215 usually waits for confirmation that the edge device has transitioned the content stream to the MPEG-2 version of the content stream. Such confirmation may take several hundred milliseconds or more. By waiting for confirmation before the SDV manager 215 returns tuning information to the MPEG-2 set-top box, the SDV manager 215 makes sure that the MPEG-2 set-top box is attempting to tune the MPEG-2 version of the content stream and not the MPEG-4 version of the content stream. However, the SDV manager 215 may deny the request of the MPEG-2 set-top box to tune to the requested SDV channel if there is insufficient output bandwidth on the appropriate EQAM modulator to switch from the MPEG-4 version to the MPEG-2 version of the content stream.

Figure 5:
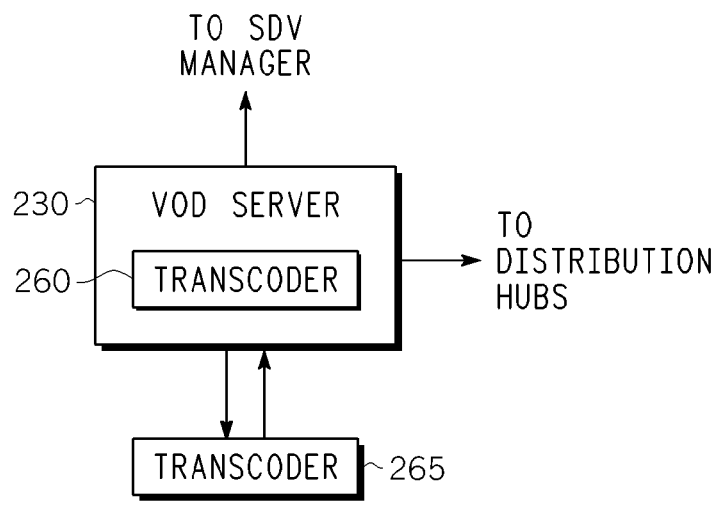
FIG. 5 is a block diagram of a VOD server suitable for use in an SDV content distribution system, including one or more content format transcoders coupled to and included within the VOD server.

Other system arrangements and configurations are suitable for dynamic transcoding. For example, the VOD server 230 can be configured to perform dynamic transcoding. Referring now to FIG. 5, shown is a block diagram of a VOD server 230 suitable for use in an SDV content distribution system. The VOD server 230 can include a transcoder 260 coupled to the VOD server. Alternatively, the VOD server can be configured in such a way that a transcoder 265 is integrated within the VOD server 230.

The VOD server 230 has stored therein or can receive a content stream, e.g., in MPEG-4 format. The VOD server 230 can output the content stream in MPEG-4 format to one or more distribution hubs. Alternatively, if one or more distribution hubs are to receive the content stream in MPEG-2 format, the VOD server 230 can transcode the content stream from MPEG-4 format to MPEG-2 format using the transcoder 260 or the transcoder 265, depending on the particular configuration of the VOD server 230. The format of the content stream output from the VOD server 230 can be in response to appropriate instructions from the SDV manager 215 or other appropriate instructions from other appropriate components coupled to the VOD server 230.

For dynamic transcoding, the VOD server 230 can deliver a unicast stream to the distribution hub edge device for each service group that will receive the SDV channel. Such is referred to as switched unicast. By delivering a unicast content stream for each service group, the VOD server is free to transition the content stream between the MPEG-2 format and the MPEG-4 format as requested by the SDV manager 215. It should be noted that this application typically requires more network bandwidth than edge device transcoding applications.

Figure 6:
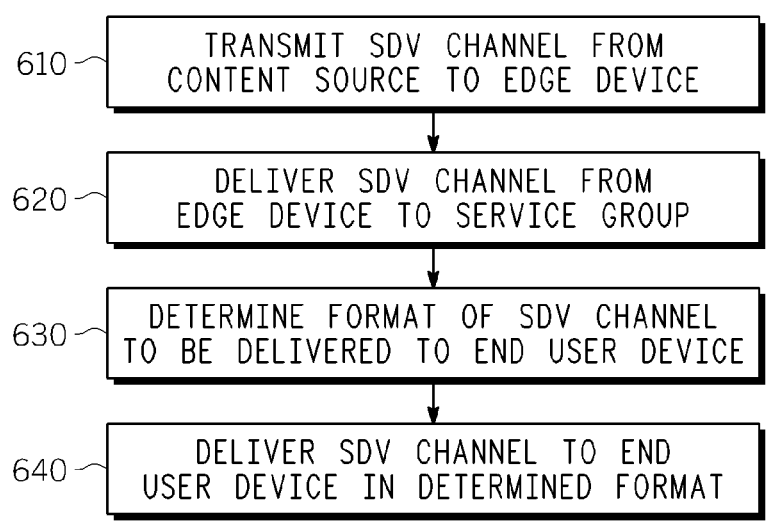
FIG. 6 is a flow chart that schematically illustrates a method for providing different types of encoded digital content in a content distribution system, such as SDV system.

Referring now to FIG. 6, shown is a flow chart that schematically illustrates a method 600 for providing different formats of encoded content within a content distribution system, such as a switched digital video (SDV) system. The method 600 includes a step 610 of transmitting a switched digital video (SDV) channel of digital content from a content source to an edge device. As discussed hereinabove, SDV channels are transmitted from the content source 210 within the headend 110 to one or more distribution hubs 130, which include one or more edge devices, such as EQAM modulators 150. As discussed hereinabove, the SDV channel can be transmitted from the content source 210 to the edge device in an MPEG-4 format or in both MPEG-4 and MPEG-2 formats.

The method 600 also includes a step 620 of delivering the SDV channel from the edge device to a service group. As discussed hereinabove, each distribution hub 130 services one or more network elements 120, such as set-top boxes and other end user processing devices, which generally are arranged into service groups, with each of the service groups being assigned to, and serviced by, one or more of the EQAM modulators 150 within the distribution hub 130.

The method 600 also includes a step 630 of determining the format of the SDV channel to be delivered to an end user network element. Such determination is made by one or more appropriate components within the SDV system, such as the SDV manager 215. As discussed hereinabove, if all of the end user network elements receiving the SDV channel within the service group are MPEG-4 compatible, the SDV channel is delivered to the network elements receiving the SDV channel in MPEG-4 format. However, if at least one of the end user network elements receiving the SDV channel within the service group are capable of receiving SDV channels only in MPEG-2 format (e.g., legacy set-top boxes), the SDV channel is delivered to the network elements receiving the SDV channel in MPEG-2 format.

The method 600 also includes a step 640 of delivering the SDV channel to the end user network elements in an appropriate format. If the SDV channel is to be delivered to the end user network elements in the applicable service group in MPEG-4 format, no format transcoding is necessary. If the SDV channel was transmitted from the headend 110 in the MPEG-4 format, no change is made to the SDV channel format before delivering the SDV channel to the end user network elements. If the SDV channel was transmitted from the headend 110 in both the MPEG-4 and MPEG-2 formats, the MPEG-4 version of the SDV channel is delivered to the end user network elements.

However, if the SDV channel is to be delivered to the end user network elements in the applicable service group in MPEG-2 format, and the SDV channel was transmitted from the headend 110 only in the MPEG-4 format, the SDV channel needs to be transcoded to the MPEG-2 format before being delivered to the end user network elements. As discussed hereinabove, the transcoding can be performed in the headend 110 by a transcoder coupled to or included within one or more components in the headend 110. Alternatively, the transcoding can be performed in the distribution hub 130 by a transcoder coupled to or included within one or more components within the distribution hub. If the SDV channel is to be delivered to the end user network elements in the applicable service group in MPEG-2 format, and the SDV channel was transmitted from the headend 110 in both the MPEG-4 and MPEG-2 formats, the MPEG-2 version of the SDV channel is delivered to the end user network elements.

The method shown in FIG. 6 may be implemented in a general, multi-purpose or single purpose processor. Such a processor will execute instructions, either at the assembly, compiled or machine-level, to perform that process. Those instructions can be written by one of ordinary skill in the art following the description of FIG. 6 and stored or transmitted on a computer readable medium. The instructions may also be created using source code or any other known computer-aided design tool. A computer readable medium may be any medium capable of carrying those instructions and includes random access memory (RAM), dynamic RAM (DRAM), flash memory, read-only memory (ROM), compact disk ROM (CD-ROM), digital video disks (DVDs), magnetic disks or tapes, optical disks or other disks, silicon memory (e.g., removable, non-removable, volatile or non-volatile), packetized or non-packetized wireline or wireless transmission signals.

It will be apparent to those skilled in the art that many changes and substitutions can be made to the methods, devices and systems herein described without departing from the spirit and scope of the invention as defined by the appended claims and their full scope of equivalents.

The invention claimed is:
1. A method for providing a switched digital video (SDV) channel to at least one service group, wherein the at least one service group includes a plurality of end user network elements, the method comprises:

receiving, by at least one edge device in a distribution hub coupled to the content source, the SDV channel in a first format, the SDV channel including a plurality of broadcast streams available to the at least one service group, wherein each of the multiple end user network elements in the service group shares access to the SDV channel by joining one of the plurality of broadcast streams;

delivering a version of the SDV channel in the first format, wherein the end user network elements in the service group joined to the SDV channel are capable of decoding content in the first format;

identifying a join to the SDV channel by an end user network element that is incapable of decoding content in the first format;

determining, based on the capabilities of the group of end user network elements in the at least one service group joined to the SDV channel, in what format to deliver the SDV channel from the at least one edge device in the distribution hub to the at least one service group coupled to the distribution hub, wherein the format is determined based on the following:

determining whether a sufficient bandwidth is available to broadcast the broadcast streams in the SDV channel in both the first format and a second format to the joined end user network elements;

broadcasting the broadcast streams in the SDV channel in both the first format and the second format to the joined end user network elements when a sufficient bandwidth is available to broadcast the broadcast streams in the SDV channel in both the first format and the second format, broadcasting the broadcast streams in the SDV channel in the second format from the at least one edge device to the joined end user network elements when there is insufficient bandwidth available to broadcast the broadcast streams in the SDV channel in both the first format and the second formats; and delivering the SDV channel from the at least one edge device in the distribution hub to at least one service group coupled to the distribution hub.

2. The method as recited in claim 1, wherein the SDV channel is transmitted to the at least one edge device in the first format and transcoded to the second format if the SDV channel is to be delivered in the second format to the end user network elements receiving the SDV channel.

3. The method as recited in claim 2, wherein the SDV channel is transcoded by a transcoder coupled to at least a portion of the distribution hub.

4. The method as recited in claim 2, wherein the SDV channel is transcoded by a transcoder included within at least a portion of the distribution hub.

5. The method as recited in claim 1, wherein the SDV channel is transmitted to the at least one edge device in the first format and in the second format.

6. The method as recited in claim 5, wherein the SDV channel is transcoded from the first format to the second format before the SDV channel is transmitted to the at least one edge device in the first format and in the second format.

7. The method as recited in claim 5, wherein the SDV channel is transcoded by a transcoder coupled to the content source.

8. The method as recited in claim 5, wherein the SDV channel is transcoded by a transcoder coupled to a network encryptor coupled to the content source.

9. The method as recited in claim 5, wherein the SDV channel is transcoded by a transcoder included within a network encryptor coupled to the content source.

10. The method as recited in claim 1, wherein the content source includes a video on demand (VOD) server, and wherein the SDV channel is transcoded from the first format to the second format by a transcoder coupled to the VOD server.

11. The method as recited in claim 1, wherein the content source includes a video on demand (VOD) server having a transcoder, and wherein the SDV channel is transcoded from the first format to the second format by the transcoder included within the VOD server.

12. The method as recited in claim 1, further comprising the step of determining whether an end user network element is capable of receiving the SDV channel in the first format based on information transmitted by the end user network element.

13. The method as recited in claim 1, wherein the first format is MPEG-4 and the second format is MPEG-2.

14. The method as recited in claim 1, wherein the end user network element is selected from the group consisting of a signal converter box, a signal decoder box, a set-top box, a digital video recorder, a digital video disk recorder, a personal video recorder device, a home media server, a digital video server, a residential gateway, a video receiver and a computer.

15. A switched digital video (SDV) system, comprising:

an SDV manager configured for determining the format of an SDV channel of digital content from a content source that is provided to at least one service group, the at least one service group including a plurality of end user network elements and the SDV channel comprising a plurality of broadcast streams available to the at least one service group, wherein each of the multiple end user network elements in the service group shares access to the SDV channel by joining one of the plurality of broadcast streams, wherein the SDV manager is configured to:
determine the capabilities of the end user network elements in the service group that are joined to the SDV channel:,
identify that the end user network elements joined to the SDV channel are capable of decoding content in the first format;
identify a join to the SDV channel by an end user network element that is incapable of decoding content in the first format;
determining whether a sufficient bandwidth is available to broadcast a broadcast stream using the SDV channel in both the first format and a second format to the joined end user network elements;

a transcoder coupled to the SDV manager, the transcoder configured to:
transcode the SDV channel in both the first format to and the second format in response to instructions from the SDV manager responsive to the SDV manager determining that at least one end user network element within the at least service group is capable of receiving the SDV channel only in the second format and there is sufficient bandwidth to broadcast the broadcast streams in the SDV channel in both the first format and the second format to the joined end user network elements transcode the SDV channel from the first format to the second format in response to instructions from the SDV manager responsive to the SDV manager determining that at least one end user network element within the at least service group is capable of receiving the SDV channel only in the second format and there is insufficient bandwidth available to broadcast the broadcast streams in the SDV channel in both the first format and the second formats.

16. The system as recited in claim 15, wherein the SDV manager determines whether an end user network element is capable of receiving digital content in the first format based on information transmitted by the end user network element to the SDV manager.

17. The system as recited in claim 15, wherein the SDV manager includes parametric information related to the capabilities of the end user network elements within the at least one service group, and wherein the SDV manager determines whether an end user network element is capable of receiving digital content in the first format based on the parametric information.

18. The system as recited in claim 15, wherein the transcoder is at least one of coupled to and included within at least component within a distribution hub coupled between the content source and the at least one service group.

19. The system as recited in claim 15, wherein the transcoder is coupled to the content source.

20. A non-transitory computer readable medium storing instructions that, when executed on a programmed processor, carry out a method for providing a switched digital video (SDV) channel of digital content from a content source to at least one service group, wherein the at least one service group includes a plurality of end user network elements, comprising instructions for:

receiving, by at least one edge device in a distribution hub coupled to the content source, the SDV channel in a first format, the SDV channel including a plurality of broadcast streams available to the at least one service group, wherein each of the multiple end user network elements in the service group shares access to the SDV channel by joining one of the plurality of broadcast streams;

delivering a version of the SDV channel in the first format, wherein the end user network elements in the service group joined to the SDV channel are capable of decoding content in the first format;

identifying a join to the SDV channel by an end user network element that is incapable of decoding content in the first format;

determining, based on the capabilities of the end user network elements in the service group joined to the SDV channel, in what format to deliver the SDV channel from the at least one edge device in the distribution hub to the at least one service group coupled to the distribution hub, wherein the format is determined based on the following:

determining whether a sufficient bandwidth is available to broadcast the broadcast streams in the SDV channel in both the first format and a second format to the joined end user network elements;

broadcasting the broadcast streams in the SDV channel in both the first format and the second format to the joined end user network elements when a sufficient bandwidth is available to broadcast the broadcast streams in the SDV channel in both the first format and the second format, broadcasting the broadcast streams in the SDV channel in the second format from the at least one edge device to the joined end user network elements when there is insufficient bandwidth available to broadcast the broadcast streams in the SDV channel in both the first format and the second formats.

\* \* \* \* \*